US011097804B2

(12) United States Patent
Deponti et al.

(10) Patent No.: US 11,097,804 B2
(45) Date of Patent: Aug. 24, 2021

(54) LEVER DEVICE

(71) Applicant: FRENI BREMBO S.P.A., Curno (IT)

(72) Inventors: Andrea Deponti, Curno (IT); Gabriele Verdelli, Curno (IT); Pierangelo Gherardi, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 16/346,913

(22) PCT Filed: Oct. 30, 2017

(86) PCT No.: PCT/IB2017/056711
§ 371 (c)(1),
(2) Date: May 2, 2019

(87) PCT Pub. No.: WO2018/083578
PCT Pub. Date: May 11, 2018

(65) Prior Publication Data
US 2019/0256168 A1      Aug. 22, 2019

(30) Foreign Application Priority Data

Nov. 4, 2016   (IT) .......................... 102016000111274

(51) Int. Cl.
*B62L 3/02*      (2006.01)
*B62K 23/06*    (2006.01)
*B60T 7/10*     (2006.01)

(52) U.S. Cl.
CPC .............. *B62L 3/023* (2013.01); *B60T 7/102* (2013.01); *B62K 23/06* (2013.01)

(58) Field of Classification Search
CPC .......... B60T 7/102; B62L 3/023; B62K 23/06
See application file for complete search history.

(56) References Cited

U.S. PATENT DOCUMENTS 4,560,049 A    12/1985  Uchibaba et al.
4,840,082 A     6/1989  Terashima et al.
(Continued)

FOREIGN PATENT DOCUMENTS

CN        205150128 U      4/2016
DE     102010040045 A1     3/2012
(Continued)

OTHER PUBLICATIONS

European Patent Office, International Search Report and Written Opinion in Application No. PCT/IB2017/056711, dated Jan. 26, 2018, 12 pages. Rijswijk Netherlands.
(Continued)

*Primary Examiner* — Melody M Burch
(74) *Attorney, Agent, or Firm* — Marshall & Melhorn, LLC

(57) ABSTRACT

A lever device for hydraulically actuating the brake or clutch of a vehicle equipped with a handlebar may have a pump assembly with a pump body connected to the handlebar of a vehicle. The pump body may have a cavity, a piston operatively associated with the pump body so as to be adapted to slide inside the cavity along a direction of thrust (X-X). The lever device may have a control lever assembly rotatably associated with the pump body so as to rotate about a pivot axis (Y-Y), the control lever assembly may have at least one control level. The piston defines a stroke free play between an end position and a first operating position. The lever device may have a stroke free play adjustment device which is adapted to adjust the distance along the direction of thrust (X-X) between the end position and the first operating position.

9 Claims, 11 Drawing Sheets

(56) References Cited

U.S. PATENT DOCUMENTS

Figure 1:
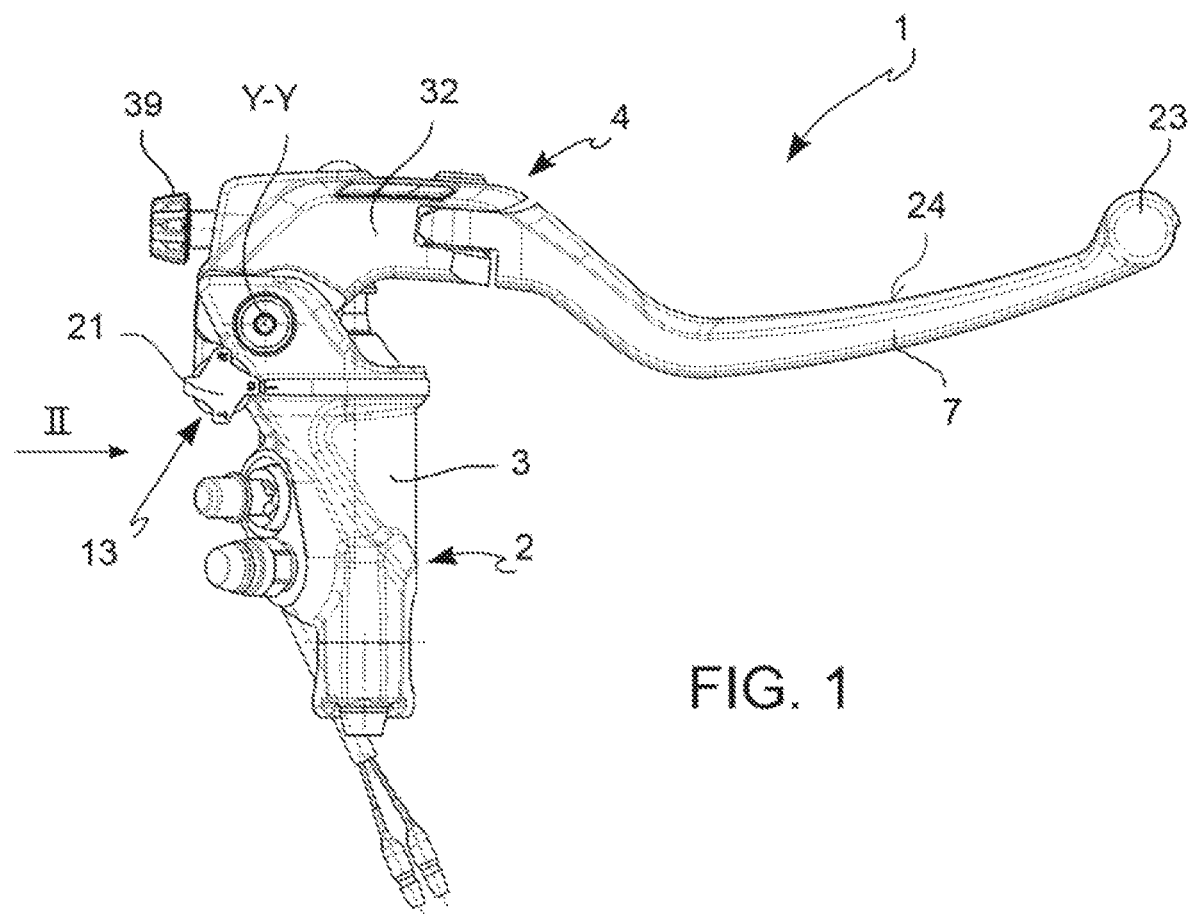

| | | | |
|---|---|---|---|
| 8,833,984 B2* | 9/2014 | Verdelli | B62K 23/06 362/473 |
| 8,943,924 B2* | 2/2015 | Thomas | G05G 1/04 188/26 |
| 2007/0283774 A1* | 12/2007 | Lavezzi | B62K 23/06 74/40 |
| 2009/0229927 A1 | 9/2009 | Brioschi | |
| 2011/0271789 A1* | 11/2011 | Colombo | B62L 3/023 74/522 |
| 2012/0124991 A1 | 5/2012 | Thomas | |
| 2013/0220064 A1 | 8/2013 | Weiher | |

FOREIGN PATENT DOCUMENTS

| | | |
|---|---|---|
| EP | 0893337 A2 | 1/1999 |
| EP | 1514791 A1 | 3/2005 |
| EP | 1864903 A2 | 12/2007 |
| EP | 1972537 A2 | 9/2008 |
| WO | 2005049416 A1 | 6/2005 |
| WO | 2007026383 A1 | 3/2007 |
| WO | 2008056379 A1 | 5/2008 |
| WO | 2014068518 A1 | 5/2014 |

OTHER PUBLICATIONS

The China National Intellectual Property Adminstration, English translation of the Chinese Office Action in application No. CN2017800818233, dated Feb. 7, 2021, 3 pages, Beijing, China.

\* cited by examiner

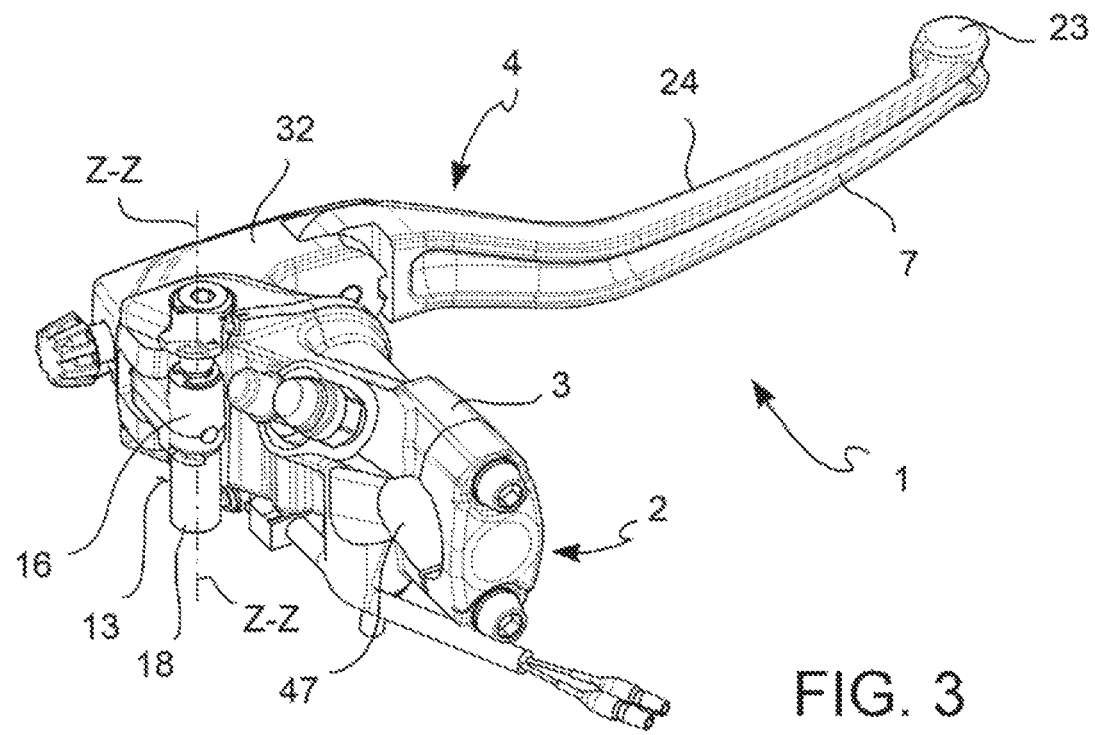
FIG. 3
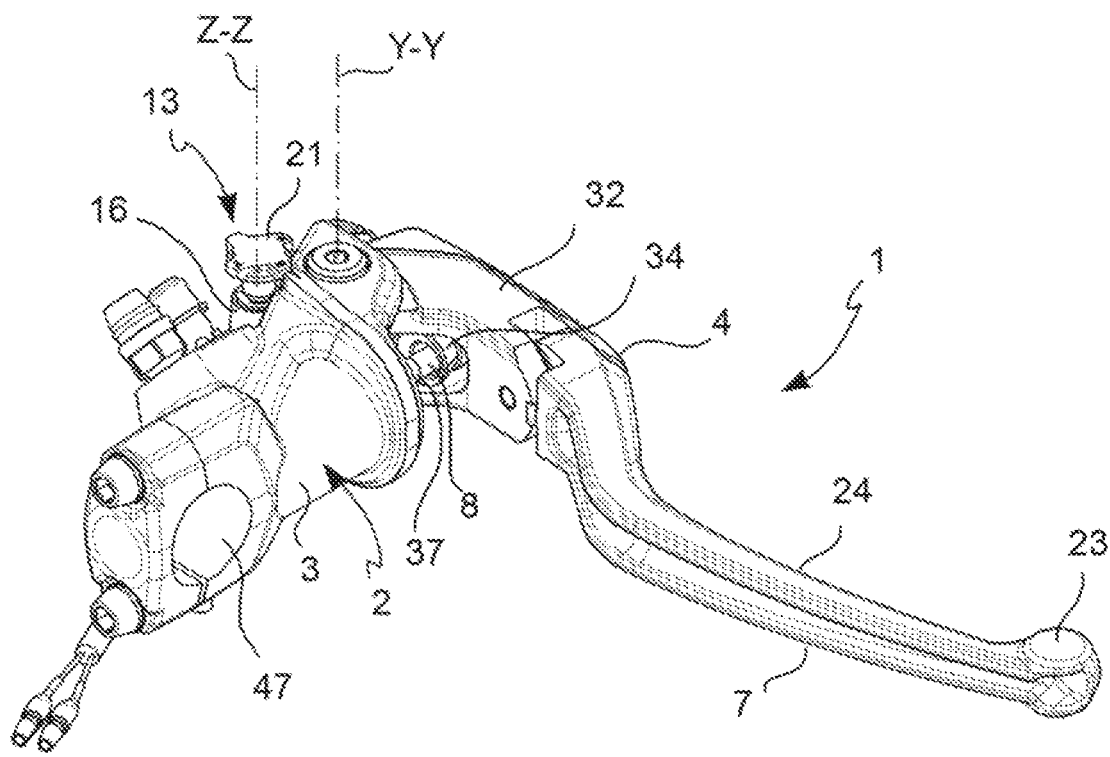
FIG. 3bis

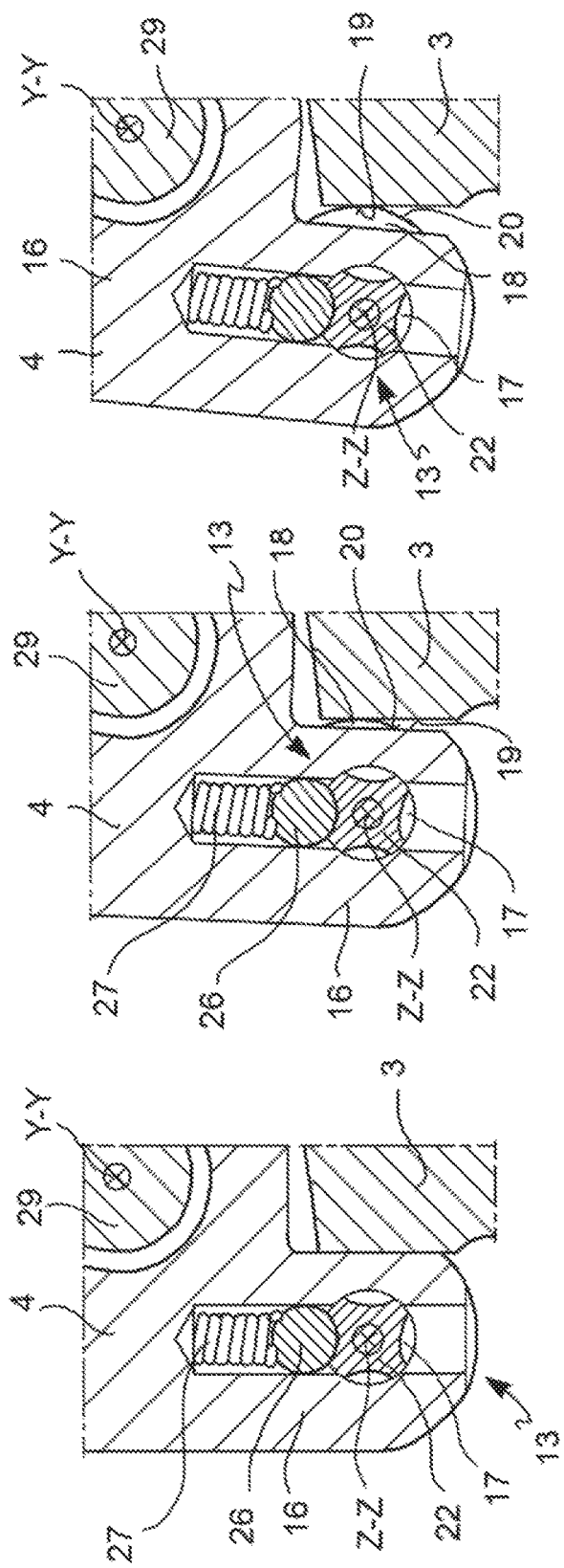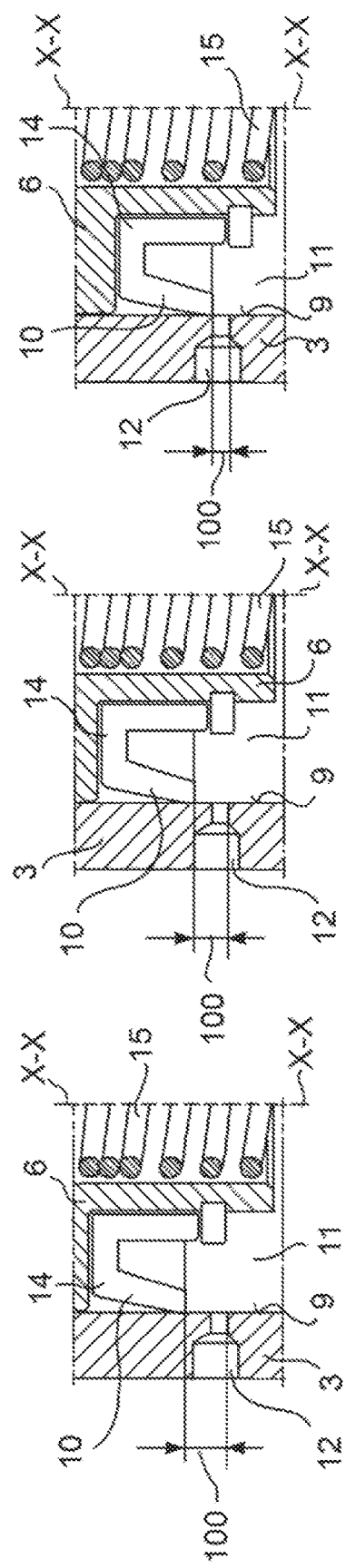

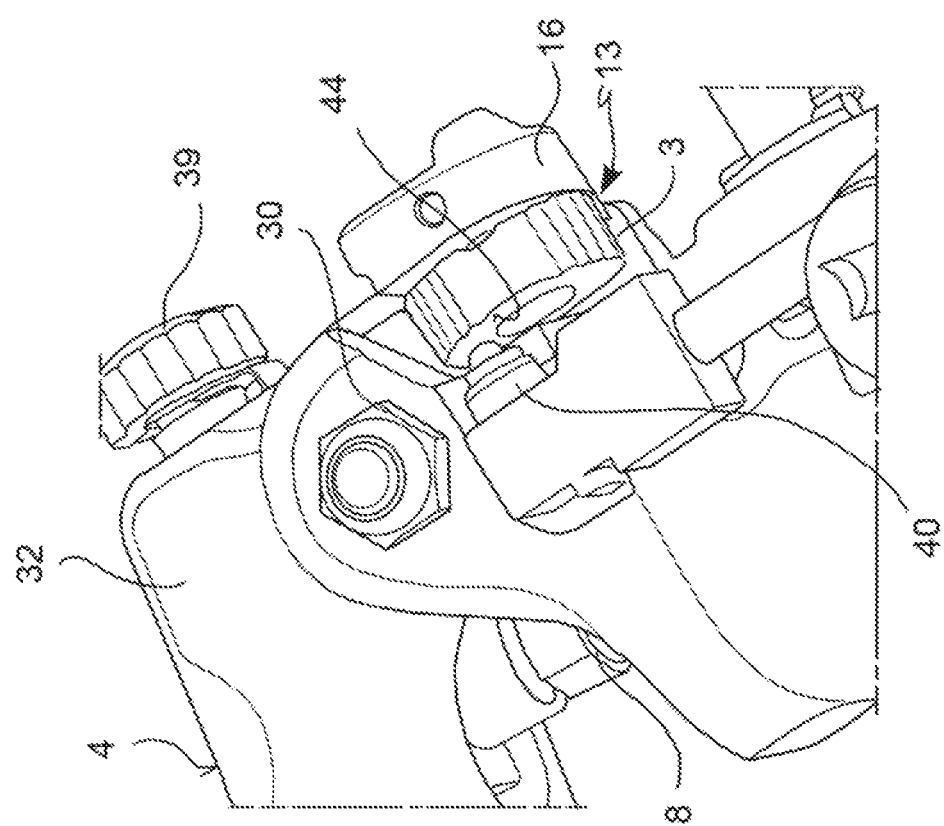
FIG. 12bis
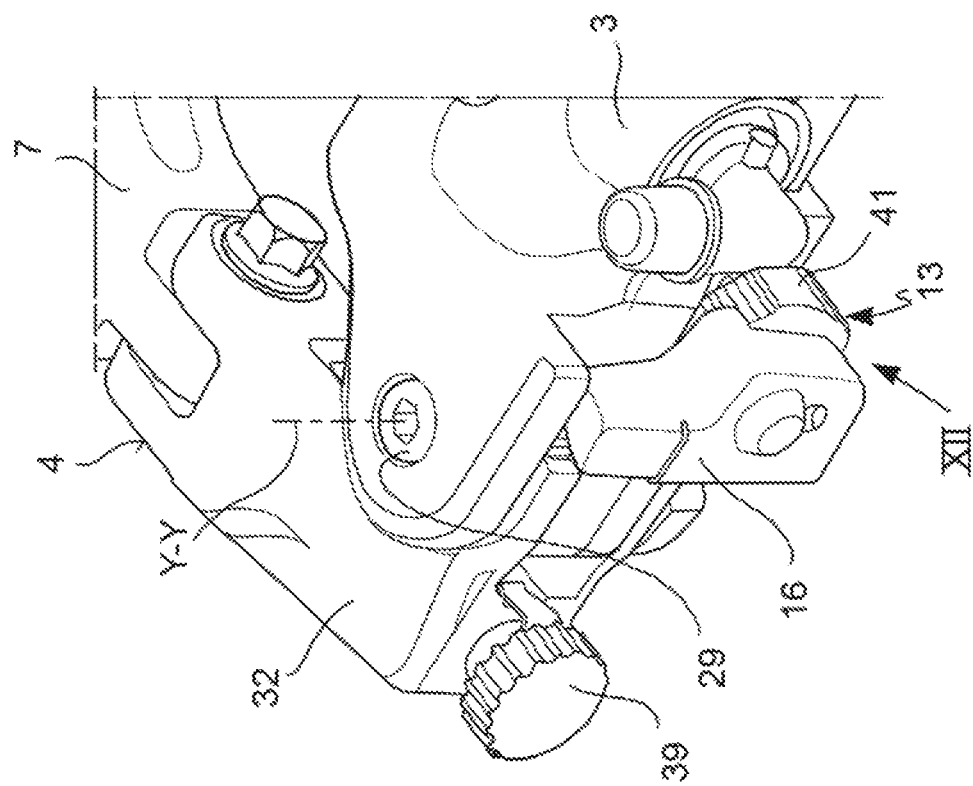
FIG. 12

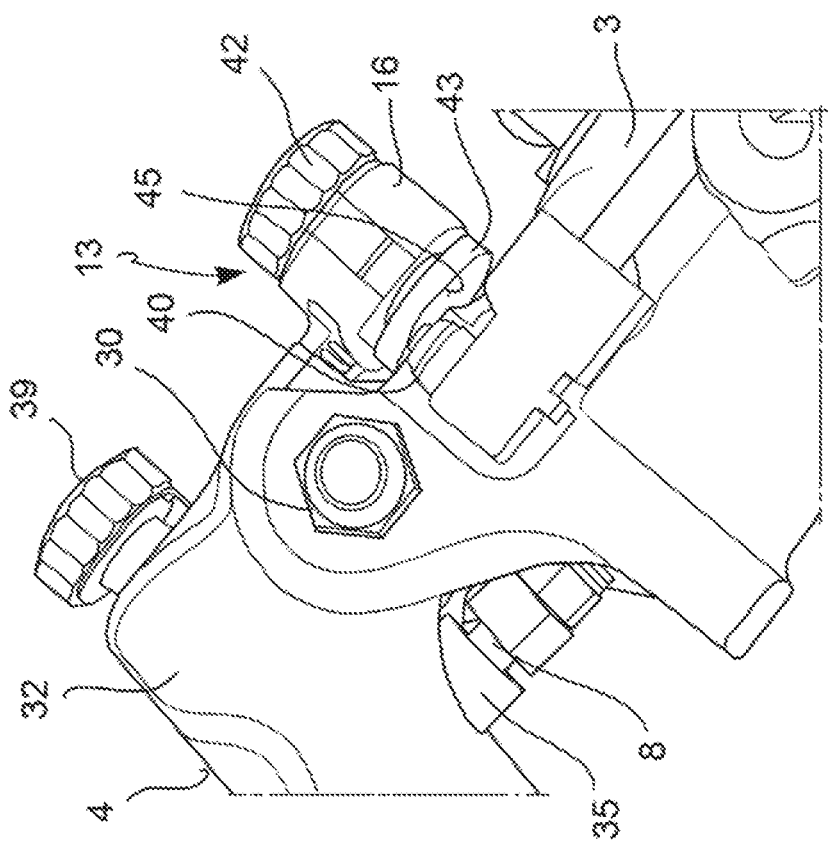
FIG. 13bis
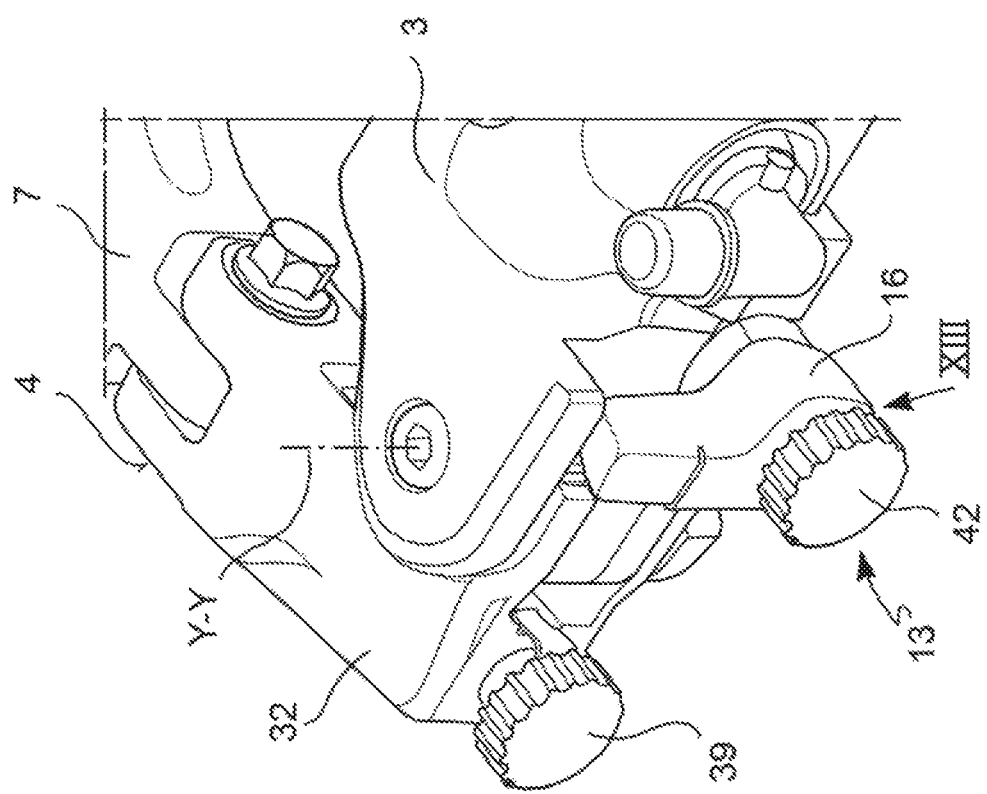
FIG. 13

LEVER DEVICE

FIELD OF THE INVENTION

The present invention relates to a lever device.

In particular, the present invention relates to a lever device for actuating the brake or clutch of a vehicle equipped with a handlebar.

BACKGROUND ART

On vehicles provided with handlebar, such as bicycles and motorcycles, the brake and/or clutch is actuated by a pump comprising a lever device mounted on the handlebar connected to a pipe comprising the actuating fluid associated with the brake or clutch to be actuated. Such a pump usually comprises a control lever and a cylinder-piston assembly, in which the control lever is arranged along the grip of the handlebar and pivots on a portion of the handlebar itself, so that the driver who grasps the grip, together with the control lever, and squeezes his or her hand, determines a rotation of the control lever about its pivot which approaches the free end portion of the control lever which is cantilevered with respect to the grip of the handlebar, producing a thrust force acting on the piston, the position of which determines a thrust on the actuating fluid to control the actuation of the brake or clutch.

The cylinder-piston assembly usually comprises a return spring which elastically biases the position of the piston to return it, when the control lever is not pressed by the driver, to its top dead center, thus determining the return of the control lever to its resting position.

As known, there are various types of handlebar having different shapes and sizes even according to the size of the hand gripping the handlebar, which varies from driver to driver. Therefore, in order to provide comfortable driving in maximum ergonomic conditions for each driver, lever device solutions have been suggested, in which the inclination of the control lever can be adjusted with respect to the handlebar grip so as to move the cantilevered free end of the lever either towards or away from the handlebar grip, as needed. For example, documents WO-2005-049416 and WO-2007-026383, also to the Applicant, show lever devices of this type, in which the control lever comprises an articulation provided between the pivot of the control lever and the cantilevered end of the lever, which allows the inclination of the control lever with respect to the grip of the handlebar. However, these solutions do not fully solve the problem and oblige to implement an increased number of movable joints, resulting in an increased construction complexity of the control lever, which results in increased possibilities of malfunctioning of the lever device.

Indeed, despite grasping the handlebar grip in a comfortable and ergonomic manner, some drivers want to press the control lever without activating the brake or clutch, while other drivers want a prompter response of the brake or clutch as soon as the lever is pressed. The distance traveled by the piston without activating the brake or clutch is generally referred to as a "stroke free play" of the piston. Correspondingly, the control lever which actuates the piston also has a stroke free play of the control lever.

The need to adjust the stroke free play of the piston, and thus the stroke free play of the control lever, is thus felt.

Therefore, the need is strongly felt to adjust the stroke free play of the piston, and thus the stroke free play of the control lever which actuates the piston, while ensuring an ergonomic and comfortable grip on the handlebar for the driver.

Particularly, in the scope of high-performance vehicles with handlebar, the need is felt to customize the amount of the stroke free play of the piston, and therefore the stroke free play of the control lever which actuates the piston.

For example, document US-2012-0124991 shows a bicycle brake pump solution in which the piston of the pump is perforated transversally to the thrust direction to accommodate an adjustment cam, which is used to adjust the stroke free play of the piston.

However, such a solution is not free from drawbacks, because it obliges to use a high number of mutually assembled parts with respect to a standard pump. At the same time, it obliges to include a hydraulic seal where the cam is mounted, in order to avoid the even minimum leakage of actuating fluid. Additionally, the adjustment by means of a cam accommodated in such a hole extended transversally to the thrust axis of the piston near the thrust axis itself allows an adjustment of the piston stroke which is necessarily limited to a portion of the dimension of the opening of the hole in which the cam is inserted. Such a variation is thus necessarily smaller than the transversal extension of the piston and particularly the variation is substantially equal to the difference between the opening of the hole and the transversal dimension of the cam.

Furthermore, the provision of a hole in the body of the piston necessarily weakens the strength of the piston itself. Particularly for applications on high-performance vehicles, a piston must be manufactured with a larger section, the strength being equal, which implies an increase of the dimension of the brake pump. The transversal dimension of the cam must also withstand the stress which arise during the step of operating, and requires the cam to a given transversal dimension. Additionally, the provision of such a hole in the piston body makes the brake pump potentially subject to brake fluid leakage.

Therefore, the need is strongly felt to adjust the stroke free play of the piston, and thus the stroke free play of the control lever which actuates the piston, while ensuring an ergonomic and comfortable grip on the handlebar to the driver.

The need is strongly felt to adjust the stroke free play of the control lever without increasing the construction complexity of the pump or decreasing the reliability thereof.

Further examples which can be related at least in part to the solution types discussed above are shown in documents U.S. Pat. No. 4,840,082, EP-0893337, U.S. Pat. No. 4,560,049, EP-1972537, US-2013-220064, DE-102010040045, US-2009-229927 and EP-1864903.

The need is thus felt to adjust the piston stroke in a simple and reliable manner.

The need is thus felt to adjust the stroke free play of the piston, and thus the control lever of which controls the piston, in real time during a quick stop, without requiring the next recalibration of the brake or clutch.

The need is strongly felt to provide a pump solution which is compact and at the same can allow a fine adjustment of the stroke free play of the control lever without dissembling the pump or the control lever.

Solution

It is an object of the present invention to solve the drawbacks of the prior art and to provide a solution to the needs mentioned hereto with reference to the prior art.

These and other objects are achieved by a lever device according to claims.

Some advantageous embodiments are the object of the dependent claims.

The suggested solutions may be applied to all vehicles which are driven by means of a handlebar, such as bicycles and motorcycles, racing motorcycles, three-wheel motorcycles or scooters, quadricycles or "quads", and racing cycles, mountain bikes, and snowmobiles. The suggested solutions may be applied to a brake system and to a clutch system. According to the application, changes will be made which however do not modify the concept of the present invention.

According to an aspect of the invention, there is provided a lever device for hydraulically actuating the brake or clutch of a vehicle equipped with a handlebar, comprising at least one pump assembly comprising connection means to the handlebar of a vehicle, the pump body delimiting a cavity, at least one piston operatively associated with the pump body so as to be adapted to slide inside the cavity along a direction of thrust.

According to an aspect of the invention, the lever device further comprises at least one control lever assembly, rotatably associated with the pump body, the control lever assembly being either directly or indirectly connected to the piston.

According to an aspect of the invention, the piston comprises a piston bottom which defines, with cylinder walls of the pump body, at least one chamber for housing the actuation fluid of the brake or clutch of the vehicle, where at least one of the cylinder walls of the pump body is interrupted to delimit the least one supply channel, which is adapted to put the chamber into fluid communication with at least one associable fluid tank, and where the piston bottom is movable with respect to the cylinder walls of the pump body within at least one end position, in which the volume of the chamber is maximum, and at least a first operating position, in which the piston bottom fluidly isolates the chamber from the supply channel, the piston defining a stroke free play between the end position and the first operating position.

According to an aspect of the invention, the lever device comprises a stroke free play adjustment device between the control lever assembly and the pump body, which stroke free play adjustment device is adapted to adjust the distance along the direction of thrust between the end position and the first operating position.

According to an aspect of the invention, the stroke free play adjustment device comprises a knob which can be accessed by the vehicle user.

According to an aspect of the invention, the lever device further comprises a stroke free play calibration device, which is adapted to adjust the stroke free play in the step of assembly or maintenance.

DRAWINGS

Figure 2:
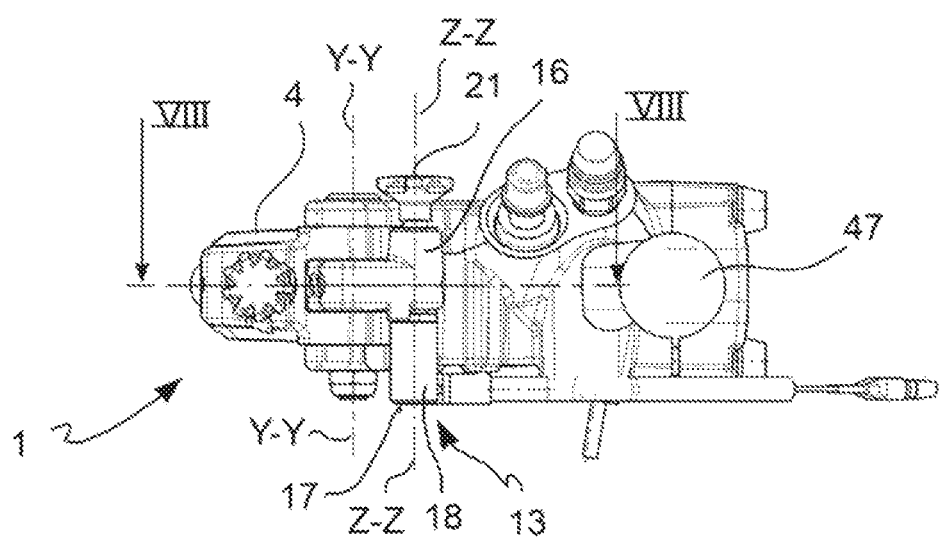
Figure 4:
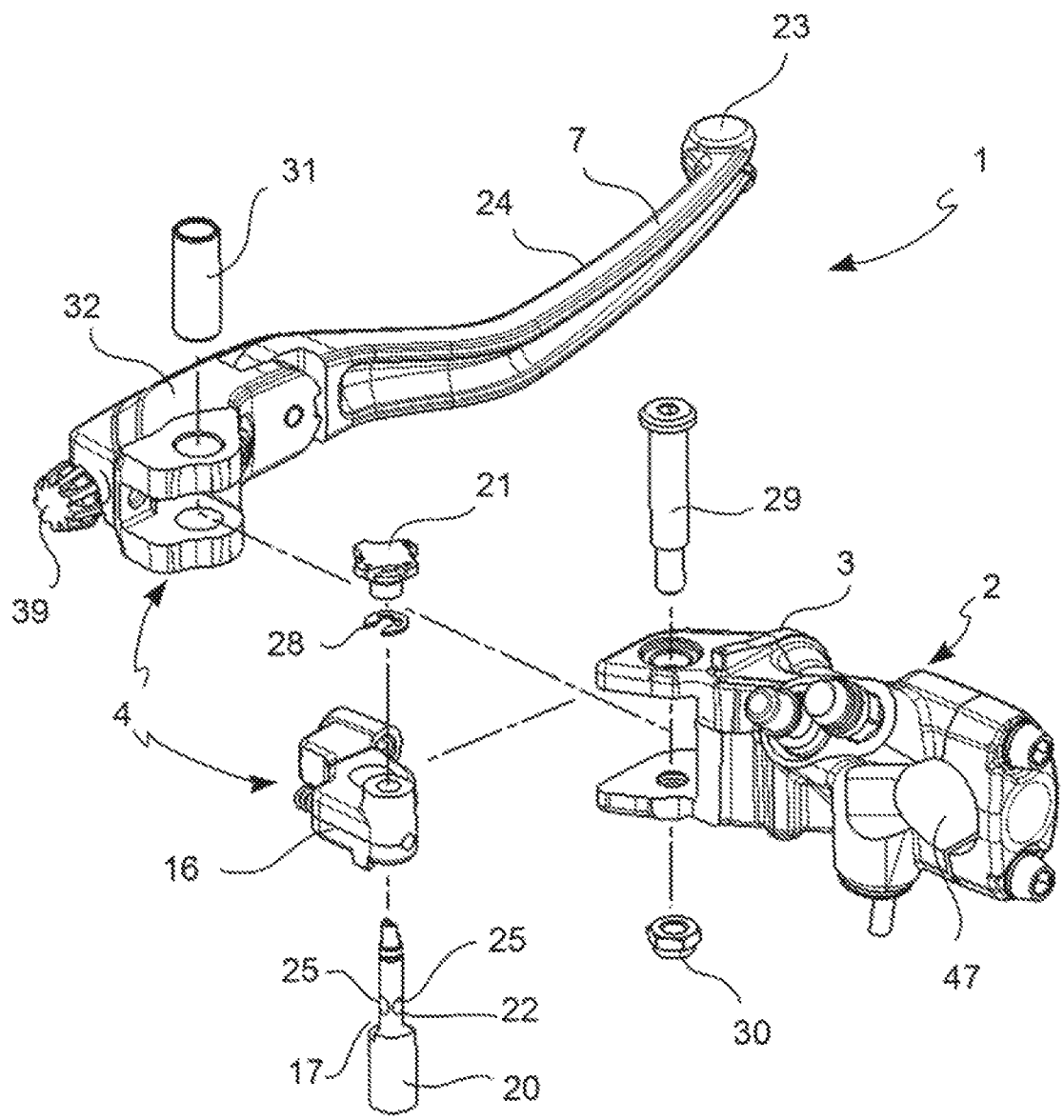
Figure 5:
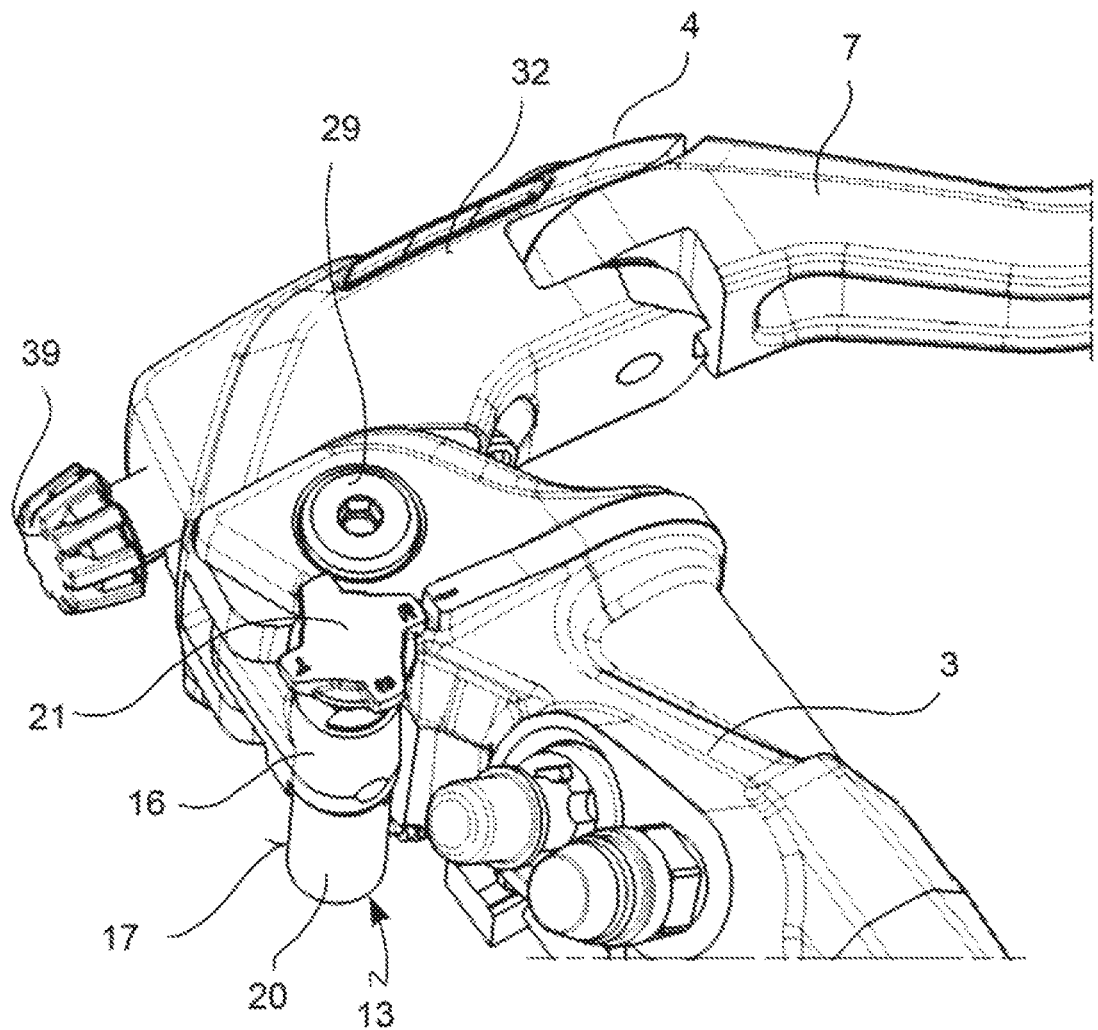
Figure 6:
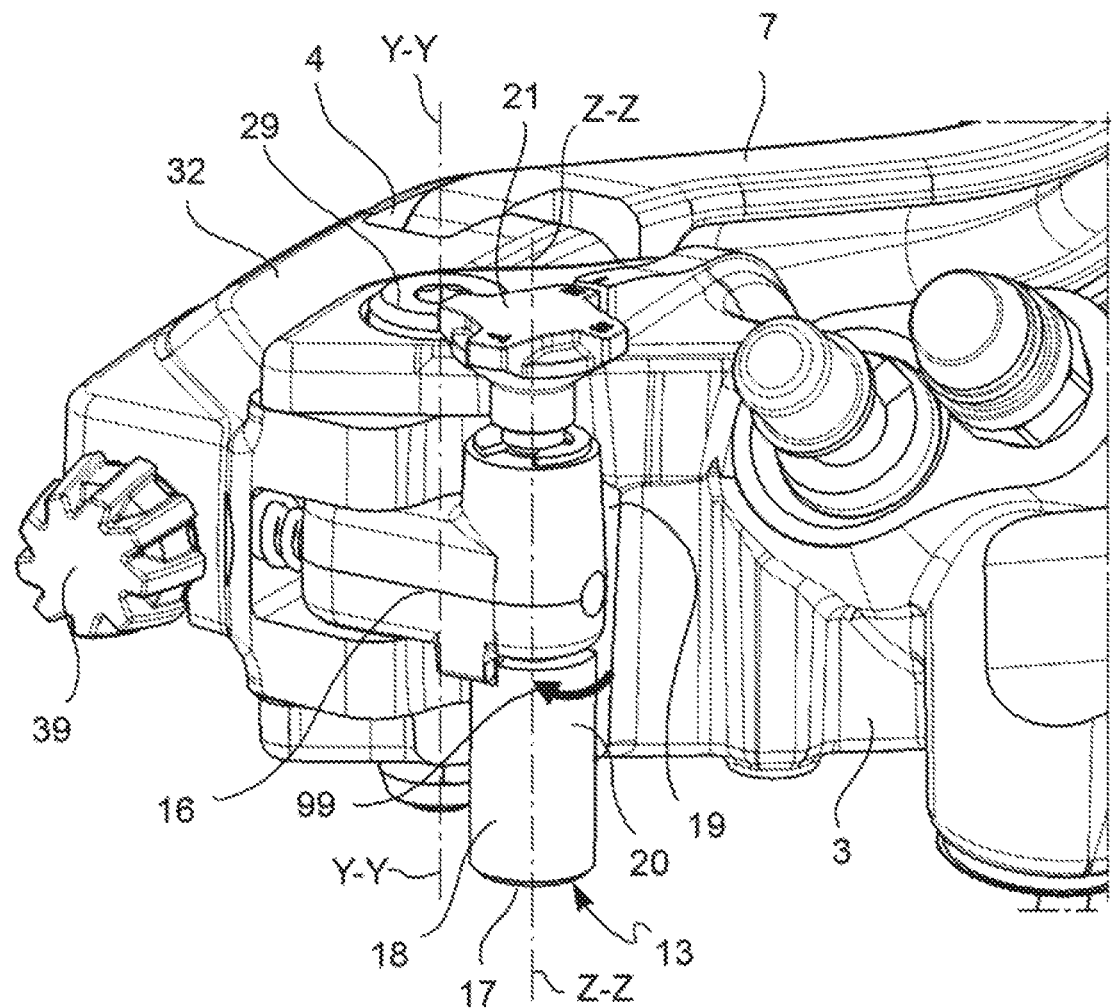
Figure 7:
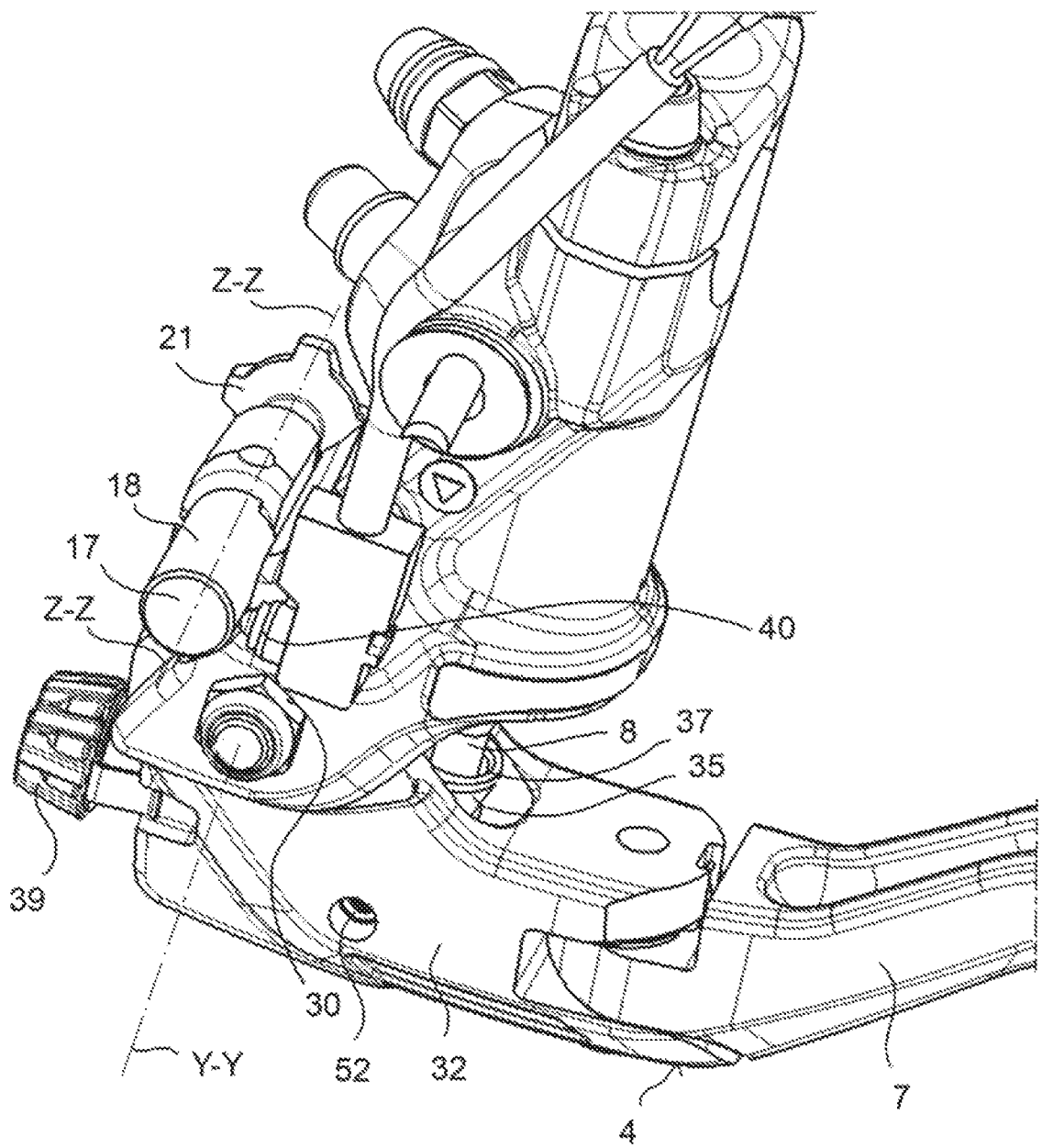
Figure 8:
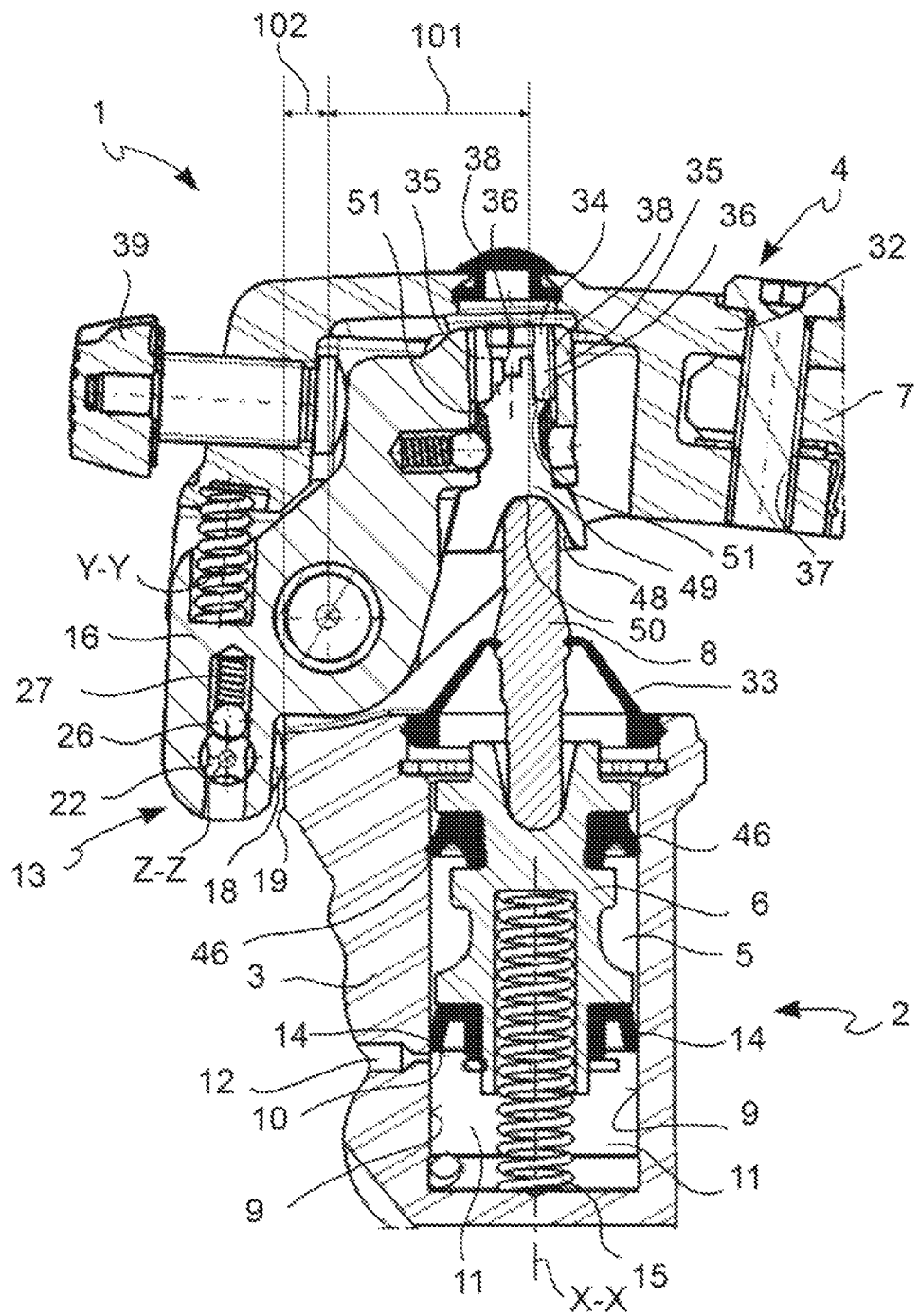
Figure 14:
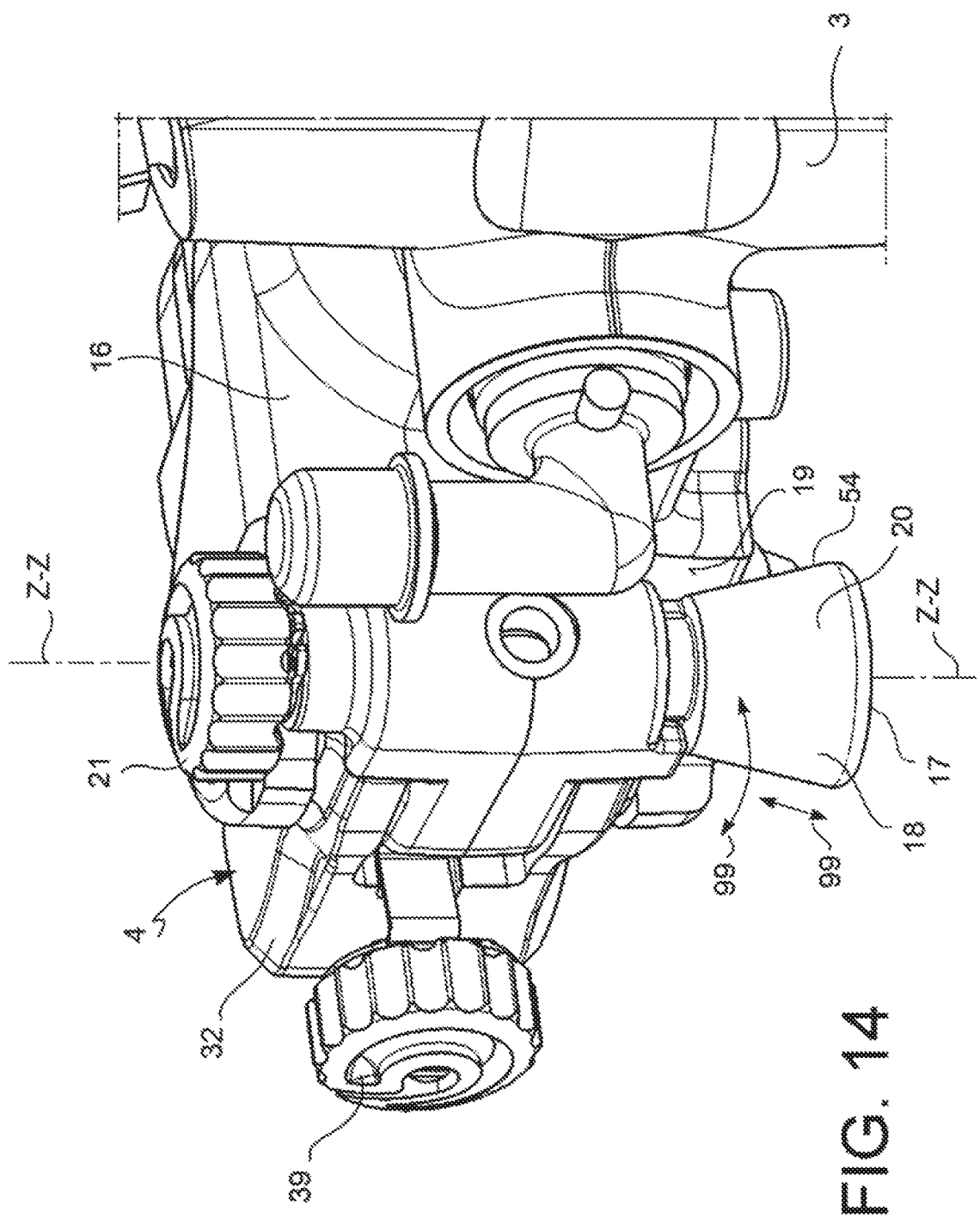

Further features and advantages of the lever device will become apparent from the description provided below of preferred embodiments thereof, given for illustrative but not limiting purposes, with reference to the accompanying drawings, in which:

FIG. 1 is a plan view of a lever device;
FIG. 2 is a view taken along arrow II shown in FIG. 1;
FIGS. 3 and 3*bis* are axonometric views of a lever device;
FIG. 4 is an axonometric view of a lever device with separated parts;
FIG. 5 is an axonometric view of a portion of a lever device comprising a stroke free play adjustment device, according to an embodiment;
FIG. 6 is an enlarged and axonometric view of a stroke free play adjustment device, according to an embodiment;
FIG. 7 is an axonometric view from the bottom of a lever device;
FIG. 8 is a diagrammatic section view taken along the cutting plane identified by arrows VII-VII in FIG. 1;
FIGS. 9 and 9*bis* are diagrammatic section views which show an adjustment of the stroke free play when the control lever is in resting position, where the section is taken along the cutting plane identified by arrows VII-VII in FIG. 1, and where FIG. 9 is an enlarged view of the stroke free play adjustment device and FIG. 9*bis* is an enlarged view of a portion of the bottom of the piston;
FIGS. 10 and 10*bis* are diagrammatic section views which show a stroke free play adjustment when the control lever is in resting position, where the section is taken along the cutting plane identified by arrows VII-VII in FIG. 1, and where FIG. 10 is an enlarged view of the stroke free play adjustment device and FIG. 10*bis* is an enlarged view of a portion of the bottom of the piston;
FIGS. 11 and 11*bis* are section views which show a stroke free play adjustment when the control lever is in resting position, where the section is taken along the cutting plane identified by arrows VII-VII in FIG. 1, and where FIG. 11 is an enlarged view of the stroke free play adjustment device and FIG. 11*bis* is an enlarged view of a portion of the bottom of the piston;
FIG. 12 is an enlarged and axonometric view of a stroke free play adjustment device, according to an embodiment;
FIG. 12*bis* is an axonometric view taken along arrow XII in FIG. 12;
FIG. 13 is an enlarged and axonometric view of a stroke free play adjustment device, according to an embodiment;
FIG. 13*bis* is an axonometric view taken along arrow XIII in FIG. 13;
FIG. 14 is an axonometric view, which shows an embodiment of a stroke free play adjustment device.

DESCRIPTION OF SOME PREFERRED EMBODIMENTS

According to an embodiment, a lever device 1 for hydraulically actuating the brake or clutch of a vehicle equipped with a handlebar is provided.

The lever device comprises a pump assembly 2.

The pump assembly 2 comprises a pump body 3 comprising connection means 47 to the handlebar of the vehicle.

The pump body 3 delimits a cavity 5. Thereby, the pump body 3 may act as a cylinder of a cylinder-piston assembly.

The pump assembly 2 further comprises at least one piston 6 operatively associated with the pump body 3 so as to be adapted to slide inside the cavity 5 along a direction of thrust X-X. The direction of thrust X-X substantially coincides with the direction of movement of the piston 6 with respect to the pump body 3.

The lever device 1 further comprises at least one control lever assembly 4, rotationally associated with the pump body 3 so as to be able to rotate about a pivot axis Y-Y.

Preferably, the control lever assembly 4 comprises at least one control lever 7. Preferably, the control lever 7 is adapted to be maneuvered by a vehicle driver. According to an embodiment, the control lever assembly 4 comprises the control lever 7, which extends in cantilever fashion, thus forming a cantilevered end 23 and a fastening root 32, which connects the control lever 7 to the pump body 3. Preferably, the fastening root 32 is pivoted on a portion of the pump body 3. Preferably, the control lever 7 and the fastening root 32 are made in separate parts and assembled by means of a fastening element 37 of the control lever 7 to the fastening root 32. Alternatively, the control lever 7 and the fastening root 32 are made in a single piece. Preferably, the control lever assembly 4 comprises a gripping portion 24 interposed between the fastening root 32 and the cantilevered end 23.

The control lever 4 is connected either directly or indirectly to the piston 6. Thereby, an action is determined on the piston 6 when the user of the vehicle provided with handlebar actuates the control lever 7.

The piston 6 comprises a piston bottom 10 which defines at least one chamber 11 with cylinder walls 9 of the pump body 3 to accommodate the actuating fluid of the brake or clutch of the vehicle. According to an embodiment, the piston bottom 10 comprises at least one piston bottom gasket 14. According to a further embodiment, the piston 6 comprises a further piston gasket 46.

At least one of the cylinder walls 9 of the pump body 3 is interrupted to delimit at least one supply channel 12, adapted to put the chamber 11 into fluid communication with at least one associable fluid tank. For example, the fluid tank is a brake fluid tank. For example, the fluid tank can be accommodated on the handlebar. According to an embodiment, the brake fluid tank is made in a single piece with the pump body 3.

According to an embodiment, the piston bottom 10 is movable with respect to the cylinder walls 9 of the pump body 3 within at least one end position, in which the volume of the chamber 11 is maximum, and at least a first working position, in which the piston bottom 10 fluidically isolates the chamber 11 from the supply channel 12. The piston 6 defines a stroke free play 100 between the end position and the first operating position.

By closing the control lever, the driver determines the movement of the piston 6 so as to gradually decrease the volume of the chamber 11. As long as the supply channel 12 is in fluid communication with the chamber 11, the actuating fluid may flow towards the fluid tank. By taking the piston bottom 10 to close the supply channel 12, a thrust action is determined on the actuating fluid which determines the actuation of the system connected to the pump assembly 2, which may be the brake or the clutch of the vehicle provided with handlebar. By increasing the pressure on the control lever 7, a further displacement of the piston 6 is obtained, which further decreases the volume of the chamber 11. In absence of the action by the driver, the piston 6 returns to the end position by virtue of the action of a return spring of the piston 15, pushing the control lever 7 into the rest position.

Advantageously, the lever device 1 comprises at least one stroke free play adjustment device 13 or adjustment device 13, adapted to adjust the distance along the direction of thrust X-X between the end position and the first operating position.

The provision of a stroke free play adjustment device 13 allows a user to rapidly adjust the stroke free play 100 of the piston 6 at any time, e.g. during a brief stop, or if required also while the vehicle is traveling.

With further advantage, the lever device 1 comprises the at least one stroke free play adjustment device 13 between the control lever assembly 4 and the pump body 3.

The provision of the at least one stroke free play adjustment device 13 arranged between the control lever assembly 4 and the pump body 3 allows to adjust the stroke free play, while maintaining a low number of mutually assembled parts. Additionally, it is avoided to arrange the at least one stroke free play adjustment device 13 directly in the body of the piston 6. Thereby, the weakening of the piston 6 is avoided, e.g. by means of adjustment holes provided in the body of the piston 6. Therefore, it will be possible to obtain a stronger piston 6, the dimensions and material being equal, with respect to known solutions. Furthermore, the risk of leakage and loss of actuating fluid which would derive from the provision of holes in the piston body is minimized.

According to an embodiment, the stroke free play adjustment device 13 comprises a knob 21 which is accessible by the user of the vehicle equipped with a handlebar. This allows to adjust the stroke free play 100 of the piston 6 by acting on the knob 21 arranged in an accessible position for a vehicle user, thus allowing to adjust the stroke free play 100 rapidly, without removing the lever device 1, e.g. in conditions of use of the vehicle provided with handlebar, e.g. in parking conditions.

According to an embodiment, the lever device 1 further comprises an element for transmitting the thrust action 8, which is interposed between the piston 6 and the control lever assembly 4 and is adapted to transmit the thrust action between the control lever assembly 4 and the piston 6. According to an embodiment, the element for transmitting the thrust action 8 is made in a single piece with the control lever assembly 4. For example, the element for transmitting the thrust action 8 is made in one piece with the fastening root 32 of the control lever assembly 4.

According to an embodiment, the element for transmitting the thrust action 8 is made in a single piece with the piston 6. According to an embodiment, the element for transmitting the thrust action 8 comprises a lever portion of contact 50 associated with the control lever assembly 4. According to an embodiment, the element for transmitting the thrust action 8 comprises a shaft. According to an embodiment, the element for transmitting the thrust action comprises a push rod. According to an embodiment, the element for transmitting the thrust action 8 is associated with a dust cuff 33, which prevents impurities from entering into the cavity 5 of the pump assembly 2.

According to an embodiment, the control lever assembly 4 operates as a class 1 lever and comprises a portion of hub 16 opposite to the control lever 7 with respect to the pivot axis Y-Y. The provision of the portion of hub 16 of the control lever assembly allows to create a class 1 lever with favorable arm about the fulcrum axis Y-Y.

According to an embodiment, a distance of first arm 101 is defined between the pivot axis Y-Y and the portion of the control lever 4 either directly or indirectly connected to the piston 6. According to an embodiment, the distance of first arm 101 is defined as the distance between the pivot axis Y-Y and the lever portion of contact 50 of the element for transmitting the thrust action 8. Preferably, the distance of first arm 101 is greater than the distance between the fulcrum axis Y-Y and the first portion of hub 16. Preferably, the distance of first arm 101 is greater than the distance of second arm 102 between the pivot axis Y-Y and the stroke free play adjustment device 13 associated with the portion of hub 16.

Preferably, the pump body 3 comprises at least one abutment surface 19, adapted to form an abutment reference for the portion of hub 16 opposite to the control lever 7 with respect to the pivot axis Y-Y. According to an embodiment, the lever device 1 comprises a fixing pin 29 which is inserted in coaxial holes provided both on the pump body 3 and on the control lever assembly 4, and on the portion of hub 16 so as to rotationally associate the control lever assembly 4 with the pump body 3. For example, the fixing pin 29 may cooperate with a fastening nut 30. For example, the fixing pin 29 may cooperate with a bushing 31.

According to an embodiment, the portion of hub 16 is made in one separate piece with respect to the control lever 7 of the control lever assembly 4. According to an embodiment, the portion of hub 16 is made in a separate piece with respect to the control lever 7 and the fastening root 32 of the control lever assembly 4.

According to a preferred embodiment, the portion of hub 16 of the control lever assembly 4 is associated with the stroke free play adjustment device 13, which extends between the portion of hub 16 of the control lever assembly 4 and an abutment surface 19 of the pump body 3.

Thereby, and by providing the distance of first arm 101 smaller than the distance of second arm 102, a displacement of the portion of hub 16 which favorably determines a greater displacement of the control lever 7 is allowed.

The provision of such a stroke free play adjustment device arranged between the portion of hub 16 of the control lever assembly 4 and the abutment surface 19 of the pump body 3 allows, when in fault condition of the pin 17, the portion of hub 16 to abut against the abutment surface 19 of the pump body 3, thus allowing to keep the value of the stroke free play 100 of the piston 6 within the values established during the installation or assembly in the factory.

The shape of the portion of hub 16 comprising an abutment portion adapted to abut against the abutment surface of the pump body 3 forces the user to actuate the stroke free play adjustment device 13 within a range of given positions during the step of assembly of the lever device 1.

The provision of such a portion of hub 16 comprising the stroke free play adjustment device 13 allows to modify the inclination of the control lever 7 with respect to the pump body 3. The provision of such a portion of hub 16 comprising the stroke free play adjustment device 13 allows to modify the inclination of the control lever 7 with respect to the thrust direction X-X of the piston 6.

By providing such a stroke free play adjustment device 13 associated with the portion of hub 16 to the control lever assembly 4, the provision of adjustment holes of the stroke free play 100 of the piston in the piston body 6 is avoided, e.g. directed transversally to the direction of thrust X-X, which would cause a structural weakening of the piston 6 itself. Therefore, it will be possible to obtain a stronger piston 6, the dimensions and material being equal, with respect to known solutions. Therefore, a user can adjust the stroke free play in vehicles requiring a high braking power without increasing the dimensions of the pump assembly 2, such as for example motor vehicles provided with handlebar, racing vehicles provided with handlebar, high-performance vehicles provided with handlebar. At the same time, it allows a user to adjust the stroke free play on light vehicles, such as for example bicycles, minimizing the dimensions of the pump assembly.

According to a preferred embodiment, the portion of hub 16 is associated with the stroke free play 13 which extends between the portion of hub 16 of the control lever assembly 4 and the abutment surface 19 of the pump body 3, where the stroke free play adjustment device 13 comprises a pin 17 having an eccentric rod 18 which makes a rod surface 20 face the abutment surface 19 of the pump body 3. The eccentric rod 18 of the pin 17 has a transversal section with respect to its longitudinal pin axis Z-Z which is eccentric, e.g. the transversal section has a cam profile. When the control lever 7 is in the resting position, the rod surface 20 of the eccentric rod 18 abuts against the abutment surface 19 of the pump body 3. Preferably, the longitudinal axis of pin Z-Z is parallel to the pivot axis Y-Y.

By turning the pin 17 of the stroke free play adjustment device 13 about its longitudinal pivot axis Z-Z in a direction of actuation 99, it faces a different portion of the rod surface 20 of the eccentric rod 18 to the abutment surface 19 of the pump body 3. Thereby, the resting position of the control lever 7 with respect to the pump body 3. Therefore, it is possible to determine the end position of the piston 6, when the control lever 7 is in resting position. It is therefore possible to adjust the stroke free play 100 of the piston 6.

According to an embodiment, the distance of second arm 102 is the distance between the pivot axis Y-Y and the abutment surface 19 of the pump body 3 adapted to form an abutment reference for the rod surface 20 of the stroke free play adjustment device 13.

According to an embodiment, the pin 17 of the stroke free play adjustment device 13 is associated with the knob 21 accessible by a user of the vehicle provided with handlebar. Thereby, the stroke free play can be adjusted without removing the lever device 1.

According to an embodiment, the pin 17 comprises an eccentric rod 18 and a rod engagement portion 22, which is longitudinally spaced from the eccentric rod 18 along the longitudinal axis of pin Z-Z, and where the rod engagement portion 22 delimits grooves 25 which cooperate with a positioning ball 26 biased by a positioning spring 27 abutting against the rod engagement portion 22, so as to define discrete rotation positions during the rotation of the pin 17 of the stroke free play adjustment device 13. Thereby, the stroke free play occurs in discreet and predetermined positions.

According to an embodiment, the rod engagement portion 22 comprises three grooves 25 circumferentially and mutually spaced apart. Thereby, three predetermined positions of the eccentric rod 18 are defined with respect to the control lever 4 and the pump body 3. Therefore, three adjustments of the stroke free play 100 are allowed. Alternatively, the rod engagement portion 22 may comprise a different number of grooves 25, e.g. three grooves or at least four grooves 25. Alternatively, the rod engagement portion 22 may be adapted to allow a continual adjustment.

According to an embodiment, the adjustment device 13 comprises an elastic ring 28 which at least partially surrounds a portion of the pin 17 and is interposed between the adjustment knob 21 and the portion of hub 16.

According to an embodiment, the lever device 1 comprises a stroke free play calibration device 34, adapted to calibrate the stroke free play 100 of the piston 6 during the step of assembly or maintenance, e.g. in the workshop. According to an embodiment, the stroke free play calibration device 34 is interposed between the control lever assembly 4 and the piston 6.

The provision of the stroke free play calibration device 34 allows to adjust the stroke free play 100 of the piston 6 during the step of assembly or maintenance, e.g. in the workshop.

By jointly providing the stroke free play calibration device 34, interposed between the control lever assembly 4 and the piston 6, and the stroke free play adjustment device 13, interposed between the control lever assembly 4 and the pump body 3, it is possible to adjust the stroke free play of the piston 100 during the step of assembling and during the step of maintaining the vehicle and in conditions of use of the vehicle. At the same time, the provision of the stroke free play calibration device 34 allows to arrange limits for the range of possible adjustments to be performed by the stroke free play adjustment device 13.

According to an embodiment, the stroke free play calibration device 34 comprises an adjustment bush 35 associated with the control lever assembly 4, where the adjustment bush 35 is associated with a body of push rod seat 49, which at least partially delimits a seat 48 which houses a portion of the element for transmitting the thrust action 8. Thereby, the element for transmitting the thrust action 8 acts between the adjustment bush 35 mounted on the control lever assembly 4 and the piston 6.

According to an embodiment, the adjustment bush 35 comprises a bush abutment surface 36 and the body of push rod seat 49 comprises a bush abutment counter-surface 51, and where the bush abutment surface 36 of the adjustment bush 35 is adapted to exert a thrust action against the bush abutment counter-surface 51 of the body of push rod seat 49 in order to adjust the position of the seat 48 with respect to the gripping portion 23 of the control lever 7. According to an embodiment, the adjustment bush 35 comprises a threaded portion 38 which engages a threaded housing provided in the control lever assembly 4, to adjust the bush abutment surface 36 of the adjustment bush 35 with respect to the gripping portion 23 to the control lever 7. By providing the threaded portion 38 by screwing or unscrewing the adjustment bush 35, it is possible to adjust the stroke free play 100 of the piston during the step of assembly or maintenance, e.g. in the workshop. Preferably, the threaded housing is provided in the portion of hub 16 of the control lever assembly 4.

According to an embodiment, the adjustment bush 35 is fixed in turn by means of a bush fixing dowel 52. This allows to prevent the vehicle user from also inadvertently tampering with the calibration of the stroke free play and in particular with the setting of the stroke free play performance at the factory. When the pump is a brake master cylinder, this would imply the effect of compromising the braking action.

According to an embodiment, the lever device 1 is a lever device for actuating the brake of vehicle equipped with a handlebar and comprises a switch 40 for the light signaling of the braking. Preferably, the switch 40 for the light indication of the brake is actuated with any adjustment of the stroke free play 100 adopted by the vehicle user.

According to an embodiment, the control lever assembly 4 comprises an auxiliary inclination adjustment system 39 adapted to adjust the inclination of the control lever 7. In other words, the auxiliary inclination adjustment system 39 is adapted to modify the orientation of the fastening root 32 with respect to the portion of hub 16, to take the gripping portion 24 of the control lever 7 either closer to or further from the handlebar of the vehicle.

According to an embodiment, e.g. shown in FIG. 14, the stroke free play adjustment device 13 comprises a pin 17 having a rod comprising a tapered portion of rod 54. Preferably, the tapered rod portion 54 increases its transversal dimension at the longitudinal pin axis Z-Z, moving it away from the knob 21. Thereby, the rod surface 20 takes a truncated-cone shape. This allows to adjust the stroke free play 100 determining the sliding of the tapered portion of the rod 54 in a direction of actuation 99 directed in direction substantially parallel to the longitudinal pin direction Z-Z. According to an embodiment, the stroke free play adjustment device 13 comprises a pin 17 having an eccentric rod 18 comprising a tapered portion of rod 54. Thereby, it is possible to adjust the stroke free play 100 by determining the sliding of the tapered portion of the rod 54 in a direction of actuation 99 directed in direction substantially parallel to the longitudinal axis of pin Z-Z and by means of the rotation of the pin 17 about the pin axis Z-X in a direction of actuation Z-Z. This allows the adjustment device 13 an increased number of possible positions, in combination with an increased fineness of adjustment.

According to a variant shown for example in FIGS. 12 and 12*bis*, the stroke free play adjustment device 13 comprises a threaded adjustment ring nut 41 mounted on a threaded shaft provided in the portion of hub 16 and comprising a surface of ring nut 44 adapted to abut against the abutment surface 19 of the pump body 3 when the control lever assembly 4 is in the resting position. The provision of the threaded adjustment ring nut 41 according to this variant allows to adjust the stroke free play either by screwing or unscrewing the threaded adjustment ring nut 41 with respect to the threaded shaft.

According to a variant shown for example in FIGS. 13 and 13*bis*, the stroke free play adjustment device 13 comprises a threaded adjustment push rod 42 housed in a threaded adjustment seat provided in the portion of hub 16 and comprising a portion of push rod 43, which comprises a surface of push rod 45 adapted to abut against the abutment surface 19 of the pump body 3 when the control lever assembly 4 is in the resting position. The provision of the threaded adjustment push rod 42 according to this variant allows to adjust the stroke free play by screwing or unscrewing the threaded adjustment push rod 42 with respect to the threaded seat provided in the portion of hub 16.

Those skilled in art may make many changes and adaptations to the embodiments described above or may replace elements with others which are functionally equivalent in order to satisfy contingent needs without however departing from the scope of the appended claims.

LIST OF REFERENCES

1. Lever device
2. Pump assembly
3. Pump body
4. Control lever assembly
5. Cavity
6. Piston
7. Control lever
8. Element for transmitting the thrust action
9. Cylinder walls
10. Piston bottom
11. Chamber
12. Supply channel or fluid supply channel
13. Stroke free play adjustment device or adjustment device
14. Piston bottom gasket
15. Piston return spring
16. Portion of hub
17. Pin
18. Eccentric rod
19. Abutment surface
20. Rod surface
21. Adjustment knob
22. Rod engagement portion
23. Cantilevered lever end
24. Gripping portion
25. Groove
26. Positioning ball
27. Positioning spring
28. Elastic ring
29. Fixing pin
30. Nut
31. Bushing
32. Control lever assembly fastening root 33. Dust cuff
34. Stroke free play calibration device
35. Adjustment bush
36. Bush abutment surface
37. Fixing element of the control lever to the fastening root
38. Threaded portion of the adjustment bush
39. Auxiliary inclination adjustment system
40. Switch
41. Adjustment ring nut
42. Threaded adjustment push rod
43. Push rod portion
44. Adjustment ring nut surface
45. Push rod surface
46. Further piston gasket
47. Connection means
48. Seat
49. Push rod seat
50. Lever portion of contact
51. Bush abutment counter-surface
52. Bush fixing dowel
54. Rod tapered portion
99. Direction of actuation of the adjustment device
100. Stroke free play
101. Distance of first arm
102. Distance of second arm
103. Control lever assembly
X-X. Thrust direction
Y-Y. Fulcrum axis
Z-Z. Longitudinal axis of pin

The invention claimed is:

1. A lever device for hydraulically actuating the brake or the clutch of a vehicle equipped with a handlebar, comprising at least one pump assembly comprising:
a pump body comprising a connection device to the handlebar of a vehicle, said pump body delimiting a cavity,
at least one piston operatively associated with said pump body so as to be suitable for sliding inside said cavity along a direction of thrust (X-X);
and wherein said lever device further comprises at least one control lever assembly rotatably associated with said pump body so as to rotate about a pivot axis (Y-Y), said at least one control lever assembly being directly or indirectly connected to said piston; said at least one control lever assembly comprises at least one control lever;
and wherein said piston comprises a piston bottom which defines, with cylinder walls of the pump body, at least one chamber for housing an actuation fluid of the brake or clutch of the vehicle, wherein at least one of said cylinder walls of the pump body is interrupted to delimit at least one supply channel, which is suitable for putting said at least one chamber into fluid communication with at least one associable fluid tank;
and wherein said piston bottom is movable with respect to said cylinder walls of the pump body, within:
at least an end position, wherein the volume of said at least one chamber is maximum,
and at least a first operating position, wherein said piston bottom fluidly isolates said at least one chamber from said at least one supply channel,
said piston defining a stroke free play between said end position and said first operating position;
and wherein said lever device comprises, between said at least one control lever assembly and said pump body, a stroke free play adjustment device which is suitable for adjusting the distance along the direction of thrust (X-X) between said end position and said first operating position,
wherein said at least one control lever assembly comprises a portion of a hub opposite to said at least one control lever with respect to said pivot axis (Y-Y),
wherein said pump body comprises at least one abutment surface of the pump body, adapted to form an abutment reference for said portion of said hub,
wherein said portion of said hub of the at least one control lever assembly is associated with said stroke free play adjustment device,
wherein said stroke free play adjustment device extends between said portion of said hub of the at least one control lever assembly and said at least one abutment surface of the pump body allowing to modify the inclination of said at least one control lever with respect to said pump body and with respect to said thrust direction (X-X).

2. The lever device of claim 1, wherein said stroke free play adjustment device comprises a knob which is accessible by users of the vehicle equipped with a handlebar.

3. The lever device of claim 1, comprising a stroke free play calibration device which is suitable for adjusting the stroke free play in the step of assembly or maintenance.

4. The lever device of claim 1, comprising an element for transmitting a thrust action, which is interposed between said at least one piston and said control lever assembly and is suitable for transmitting the thrust action between said control lever assembly and said piston.

5. The lever device of claim 1, wherein said stroke free play adjustment device comprises a pin having an eccentric rod which faces a rod surface of said at least one abutment surface of the pump body, so that when said at least one control lever is in a resting position, said rod surface abuts against said at least one abutment surface of the pump body; and/or wherein
said pin further comprises a rod engagement portion, which is longitudinally spaced from said eccentric rod along the longitudinal axis (Z-Z) of pin, and wherein said rod engagement portion delimits grooves which cooperate with a positioning ball affected by a positioning spring abutting against said rod engagement portion, so as to define discrete rotation positions during the rotation of said pin of the stroke free play adjustment device.

6. The lever device of claim 1, wherein said stroke free play adjustment device comprises a pin having a rod comprising a tapered portion; and/or wherein
a rod surface of said rod is truncated-conical; and/or wherein
said stroke free play adjustment device comprises a pin having an eccentric rod comprising a tapered portion.

7. The lever device of claim 1, wherein said stroke free play adjustment device comprises a threaded adjustment ring nut mounted on a threaded shaft provided in said portion of said hub and comprising a surface of ring nut suitable for abutting against said at least one abutment surface of the pump body when said control lever assembly is in the resting position; and/or wherein
said stroke free play stroke adjustment device comprises a threaded adjustment push rod housed in a threaded adjustment seat provided in said portion of said hub and comprising a portion of said push rod which comprises a surface of push rod suitable for abutting against said at least one abutment surface of the pump body when said control lever assembly is in a resting position.

8. The lever device of claim 1, wherein said control lever assembly comprises said at least one control lever which extends in a cantilever fashion, thus forming a cantilevered end and a fastening root which connects said at least one control lever to said pump body; and/or wherein
- said fastening root is pivoted on a portion of said pump body; and/or wherein
- said at least one control lever and said fastening root are made in separate pieces; and/or wherein
- said at least one control lever and said fastening root are made in a single piece; and/or wherein
- said control lever assembly comprises a gripping portion interposed between said fastening root and said cantilevered end; and/or wherein
- said portion of said hub is made in a separate piece with respect to said control lever of said control lever assembly; and/or wherein
- said portion of said hub is made in a separate piece with respect to said at least one control lever and said fastening root of said control lever assembly; and/or wherein
- said piston bottom comprises a piston bottom gasket; and/or wherein
- said longitudinal axis (Z-Z) of a pin (Z Z) is parallel to the pivot axis (Y-Y); and/or wherein
- a rod engagement portion comprises at least two grooves which are circumferentially spaced from each other so that at least two predetermined positions of an eccentric rod are defined with respect to the control lever assembly and the pump body; and/or wherein
- said lever device is a lever device for actuating the brake of vehicle equipped with a handlebar and comprises a switch for a light signaling of the braking; and/or wherein
- a distance of a first arm is defined between said pivot axis (Y-Y) and the portion of the at least one control lever directly or indirectly connected to the piston; and/or wherein
- said distance of said first arm is defined as the distance between said pivot axis (Y-Y) and a lever portion of contact of an element for transmitting the thrust action; and/or wherein said distance of said first arm is greater than a distance of second arm between said pivot axis (Y-Y) and said stroke free play adjustment device associated with said portion of said hub; and/or wherein
- said control lever assembly comprises an auxiliary inclination adjustment system suitable for adjusting the inclination of the at least one control lever.

9. The lever device of claim 3, wherein said stroke free play calibration device comprises an adjustment bush associated with said control lever assembly, wherein said adjustment bush is associated with a body of push rod seat which at least partly delimits a seat which houses a portion of an element for transmitting the thrust action; and/or wherein
- said adjustment bush comprises a threaded portion mounted in a threaded portion of the control lever assembly for adjusting the position of said seat with respect to said control lever assembly; and/or wherein
- said adjustment bush comprises a bush abutment surface and said body of push rod seat comprises a bush abutment countersurface, and wherein said bush abutment surface of the adjustment bush is suitable for exerting a thrust action against said bush abutment counter-surface of the body of said push rod seat in order to adjust the position of said seat with respect to a gripping portion of the at least one control lever.

* * * * *